US006970826B2

(12) United States Patent
Christensen et al.

(10) Patent No.: US 6,970,826 B2
(45) Date of Patent: Nov. 29, 2005

(54) METHOD AND SYSTEM FOR ORDER RETURNS

(75) Inventors: James E. Christensen, Cortlandt Manor, NY (US); Sastry S. Duri, Yorktown Heights, NY (US); Paul A. Moskowitz, Yorktown Heights, NY (US); John S. Murdock, Jr., New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 09/874,195

(22) Filed: Jun. 5, 2001

(65) Prior Publication Data

US 2002/0184106 A1 Dec. 5, 2002

(51) Int. Cl.[7] .............................................. G06F 17/60
(52) U.S. Cl. ............................ 705/1; 705/26; 705/27
(58) Field of Search ............................ 705/26, 27, 28, 705/1, 24; 707/104

(56) References Cited

U.S. PATENT DOCUMENTS 4,504,945 A * 3/1985 Kunikyo ..................... 370/443
5,664,110 A    9/1997 Green et al.
6,085,172 A * 7/2000 Junger ......................... 705/28
6,304,881 B1 * 10/2001 Halim et al. ................ 707/201
2002/0032612 A1 * 3/2002 Williams et al. ............ 705/26

FOREIGN PATENT DOCUMENTS

EP          999510 A2 * 5/2000 ........... G06F 17/60

OTHER PUBLICATIONS

Grant, Lorrie, "Internet has become integral part of everyday life", Apr. 21, 1999, USA Today, Money Section, p. 06B.*

* cited by examiner

Primary Examiner—Robert Olszewski
Assistant Examiner—James Kramer
(74) Attorney, Agent, or Firm—Ohlandt, Greeley Ruggiero & Perle L.L.P.; Daniel P. Morris (57) ABSTRACT

A system and method for handling the return of items supplied by a store. The method entails building a list of items to be returned on a local computing device. The list is sent to a remote server that handles returns for the store. The remote server returns a confirmation of the items that are returnable and/or of items that are not returnable. As the list is built, each item is compared to a return policy of the store and added to the list only if the item qualifies as returnable. The method also allows for requesting the store to honor the return of items that do not qualify for return. Provision is also made for scheduling pickup of items to be returned.

43 Claims, 6 Drawing Sheets

FIG. 1. 100 Environment

FIG 2. 200 System Architecture

FIG 3. 300 Order Creation / Transmission Process

FIG. 4A   Return Process - Upper Level View

FIG. 4B Build Return List

FIG. 5 Policy Check

METHOD AND SYSTEM FOR ORDER RETURNS

The present invention relates generally to a system and method that enables the return of items, such as groceries and other consumer products.

BACKGROUND OF THE INVENTION

The retail industry is familiar with the compilation of a shopping list through the use of an optical bar-code scanning system. It also has made use of fulfillment of orders by means of network transmission of data containing the order. However, the retail industry has not solved the problem of the implementation of an integrated means for the return of items. Another problem is that imposed by optical bar code scanning. Commonly used bar codes, e.g. the UPC (Universal Product Code) bar code, contain a limited number of bits of information, ten digits equal to about 32 bits of information. It is desirable to be able to use methods that encode more than 32 bits of information so as to include additional information, such as date of manufacture, date of sale, serial number of the specific item, etc. In addition, while it is common to deduce information about buying patterns of customers from their purchases, information from the return of items also needs to be used for effective data mining.

SUMMARY OF THE INVENTION

The present invention provides a system and method that enables the return of items to a business establishment, such as a supplier. The method develops a list of items to be returned by checking each of the items to be returned with a return policy of the business establishment and adding to the list only those items that are returnable according to the return policy. The list of items is presented for processing by the business establishment. The method also identifies a confirmation of the items on the list that are returnable and/or any of the items that are not returnable.

The list is developed by entering the items in a computing device via an input device, such as a keyboard, a mouse, a touch screen, a stylus pad, a radio frequency tag reader, a bar code reader, a microphone and the like. The input device may be located locally or remotely to the computing device.

The return policy is stored locally or remotely to a computing device. The return policy, according to one aspect of the method, includes at least one rule that a temporal or usage condition must be satisfied. According to another aspect of the method, the policy includes a dynamic rule that a business value condition must be satisfied. The business value condition may be a current business condition and market, an inventory level, a weather condition, a seasonal factor, an age/value curve for the product or any combination thereof.

Another aspect of the method of the present invention develops a notice to return an item that is not returnable according to the policy and presents the notice to the business establishment. A further aspect of the method determines if the return policy requires that one of the items must be physically returned to the business establishment. If not, a notice that the item can be discarded is presented. A still further aspect of the method determines if the business establishment will have the item picked up. If so, a pick up of the item is scheduled. If not, a notice that the item must be transported to the business establishment is presented.

Another aspect of the method collects data associated with the returns for data mining. The collected data may include a customer identification, a product identification, a store where purchased, a date of purchase, a date of return, a quantity purchased, quantity returned, a reason for return, or whether or not to return was handled as an exception to the returns policy.

The system of the invention comprises a computing device that performs the method of the invention and/or a media that controls the computing device to perform the method of the invention.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

The return method of the present invention begins when a customer or user is ready to return items purchased from a business establishment, e.g., a store. The method begins by displaying the customer's personalized shopping list on a computing device. The customer selects a tab marked as "return" to view the products in the return list. The customer then builds a list of items to be returned. The list is then processed according to the return policies for the business establishment. A confirmation of the items to be returned that are returnable and/or a notice of items that are not returnable is generated for and/or presented to the customer.

The item return list is built by adding or deleting items from the list presented to the customer. Products can be added to the list via several different types of input devices including a keyboard, a mouse, a touch screen, a stylus pad, a bar code reader, a microphone, a radio frequency tag reader, and the like. If for some reason the product does not have an identification (ID), or the ID is not recognized, the customer enters an approximate description of the product.

The method checks each of the items to be returned with a return policy of the business establishment and adds to the list only those items that are returnable according to the return policy.

If an item is determined not returnable according to the return policy, a notice is developed not to return that item and the notice is presented to the customer.

The return policy includes a rule that a condition must be satisfied. The condition may be a temporal condition, a usage condition and/or a dynamic business value that changes according to current business conditions and markets, inventory levels, weather conditions, seasonal factors, the age/value curve for the product and the like. An example of a temporal condition is that the item must be returned within a certain time from the date of purchase. An example of a usage condition is a compact disc or software that cannot be returned once the seal is broken.

The method also determines if the item must be physically returned. For example, sour milk might not need to be physically returned. If the item must be physically returned, the method determines if pickup is available and, if so, schedules the pick up date and time. The account of the customer is then credited.

Figure 1:
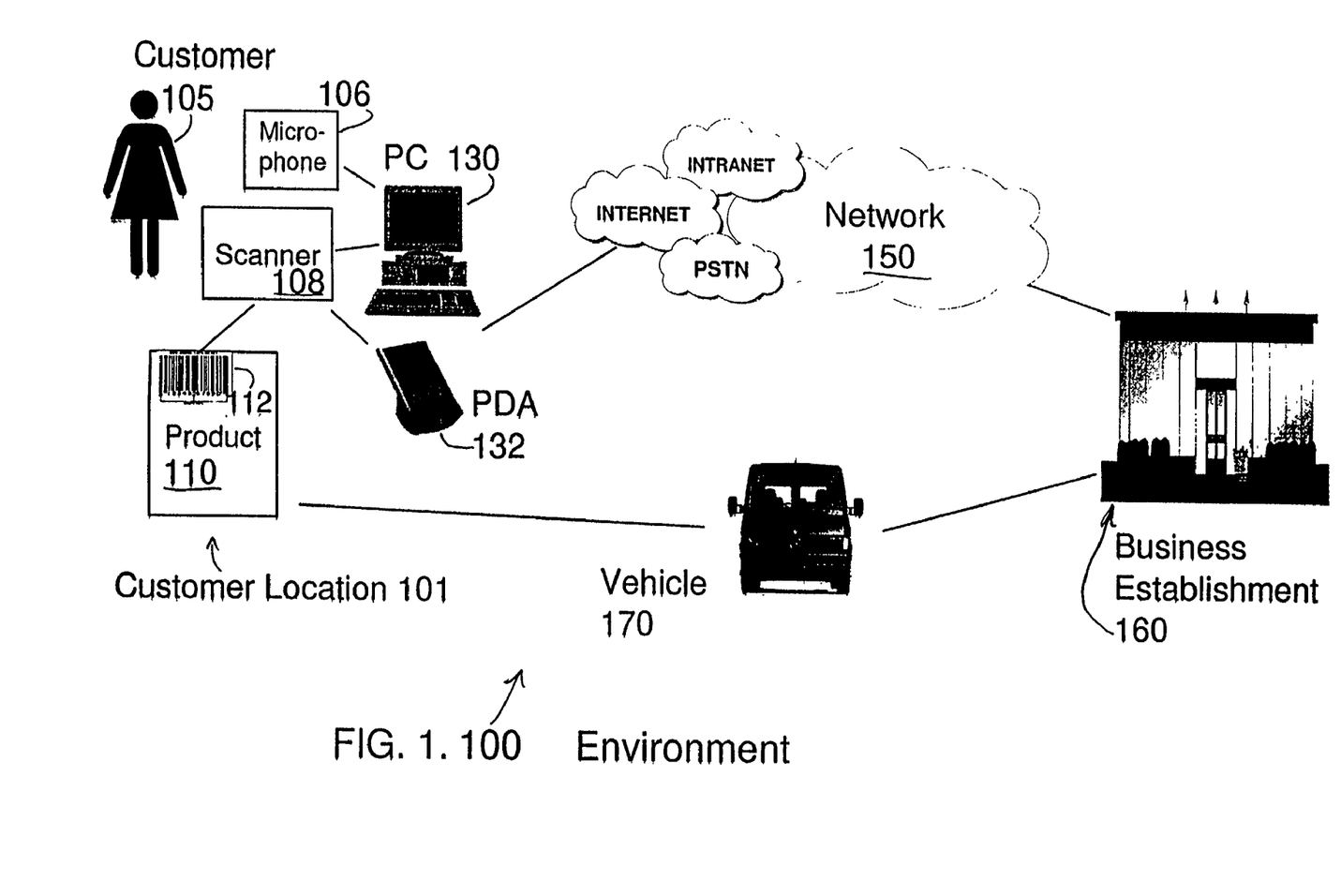
FIG. 1 illustrates an upper level environment in which the system and method of the present invention are utilized.

Referring to FIG. 1, an upper level environment 100 depicts a customer 105 with a product 110 at a customer location 101 to be returned to a business establishment 160, such as a retail store. Product 110 may be identified in one of several ways. In a preferred embodiment, product 110 is labeled by a bar code 112 attached thereto. Bar codes consisting of alternating lines of different width are commonly printed onto packaging materials or onto labels that are attached to a product or its packaging material. Through the use of a bar code scanner, bar codes are used to identify items at the point of sale. While the ten-digit UPC barcode is the most frequently used, additional information storage may be obtained by the use of two-dimensional bar codes, e.g. the PDF417 code, which may carry kilobits of information. Bar code scanners are manufactured by Symbol Technologies of Holtsville, N.Y. and others.

Another type of automatic product identification, sometimes referred to as autoid, is radio frequency identification (RFID) tags. While the UPC contains 10 digits or about 32 bits of information, RFID tags may hold kilobits of information. As a result, RFID tags may contain additional information, such as date of manufacture, date of sale, serial number of the specific item, etc. RFID tags are also attached to a product or its packaging and are constructed with electronic circuitry (including semiconductor chips), an antenna, and possibly a battery. Such tags are read by a specialized RFID reader. RFID tags and scanners are manufactured by Texas Instruments, Motorola, Intermec, and others.

A scanner 108 that may be either a bar code scanner or an RFID reader is provided to read the bar code or RFID tag attached to product 110. In the description that follows, by way of example, the tag will be referred to as bar code 112 and the scanner as bar code scanner 108. Scanner 108 is coupled to a local computing device, such as a personal computer (PC)130, e.g., an IBM NetVista or ThinkPad or a personal digital assistant (PDA) 132, e.g., a PalmPilot. In this embodiment, the local computing device is shown at the customer location. As used herein, local means that the device is used by the customer. However, the local computing device may be used in a mobile mode at any location.

Scanner 108 operates to read bar code label 112 of product 110 to be returned and to couple the read data to PC 130 or PDA 132. Alternatively, voice input may be used to enter product identification into a computing system. To this end a microphone 106 is connected to PC 130. To interpret the voice input, PC 130, for example, may use voice recognition software, such as IBM's ViaVoice program.

PC 130 and/or PDA 132 are connected to a network 150, which may be a public switched telephone network (PSTN), an intranet, the Internet, the World Wide Web (WWW) and the like. The connection to network 150 may be hardwired or wireless, e.g. wired or wireless phone connections. Network 150 is in turn connected to business establishment 160. Business establishment 160 may include one or more buildings with facilities to house a return server and its associated databases (shown in FIG. 2), and facilities for dispatching a vehicle 170 to collect product 110 to be returned and/or to provide a replacement.

Figure 2:
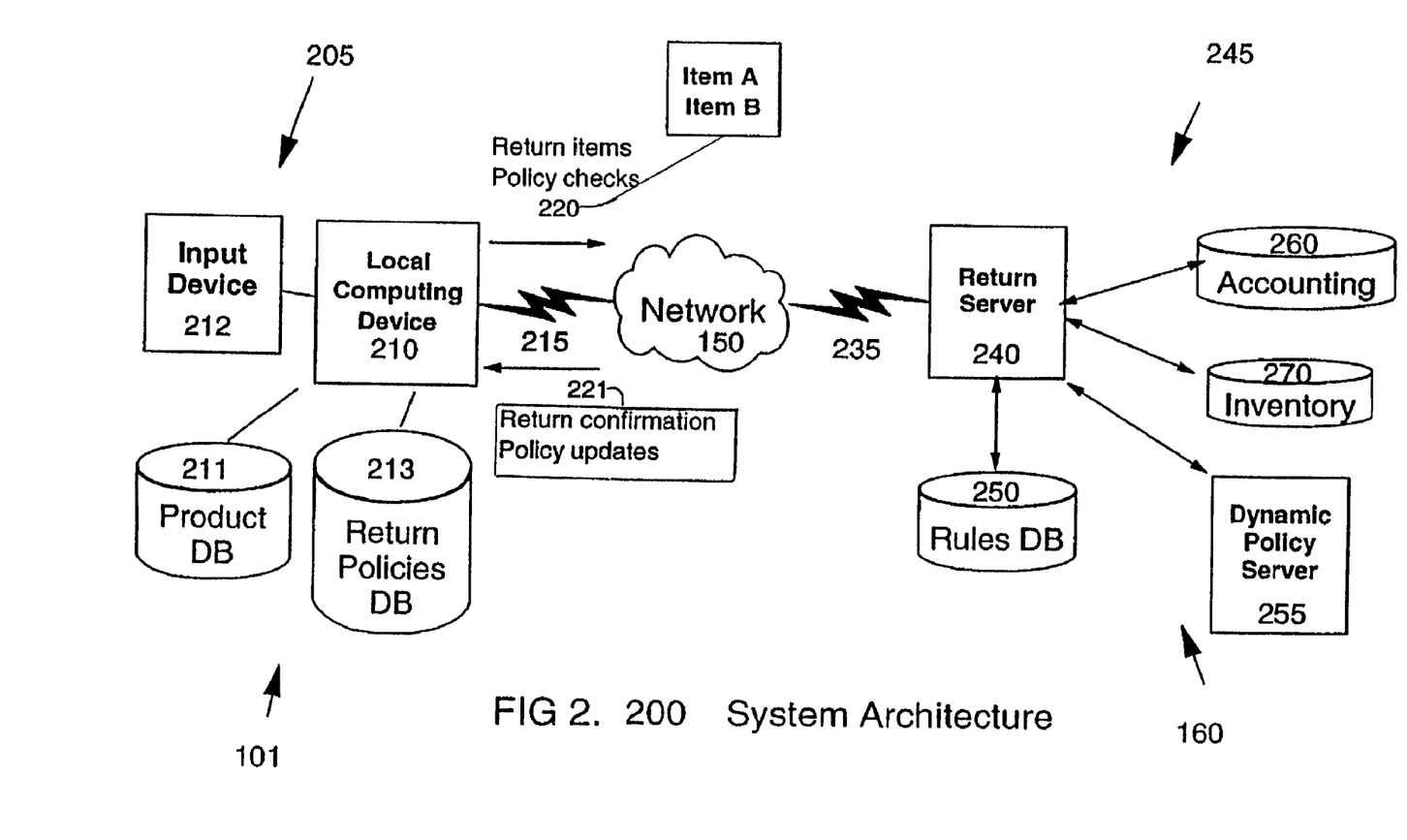
FIG. 2 is a schematic diagram showing the computing system architecture according to a preferred embodiment of the invention.

Referring to FIG. 2, a computing system architecture 200 depicts network 150 interconnected with devices 205 associated with the customer location 101 and with devices 245 associated with business establishment 160. Devices 205 include a local computing device 210, an input device 212, a product database 211 and return policies database 213. Thus, the return policy is stored locally to local computing device and is updated when updates are received. Devices 205 may all be located at customer location 101 or in separate locations. For example, product database 211 and/ or product database 213 may be remotely located from customer location 101 and accessible by local computing device 210 via network 150.

Devices 245 include a return (remote) server 240, a dynamic policy server 255, a rules database 250, an accounting server 260 and an inventory server 270. Return server 240 is remote in the sense that it is not at the location, e.g., home, office etc., of the customer. Remote server 240 gives notice of any updates to the return policy, which are used to refresh the local return policies database 213. Devices 245 may all be located at business establishment 160 or in separate locations. For example, rules database 250, accounting database 260 and/or inventory database 270 may be remotely located from business establishment 160 and accessible by return server via network 150. Local computing device 210 and return server 240 are linked through network 150 by communication links 215 and 235, that may be wireless or wired.

Customer 105 uses input device 212 to identify and record items that are candidates for return to business establishment 160. Input device 212 provides this information to local computing device 210, which first builds a return list 220 as described hereinafter. The process of building return list 220 may involve the selection of products enumerated in local product database 211, which is created and maintained by a process to be described hereinafter. When a partial or complete return list 220 exists, the return policies database 213 must be consulted. For efficiency, return policies database 213 is created to reside on the local computing device 210. The return policies are useful to advise customer 105 of the likely return status of an item. In all cases, return list 220 must be sent via network 230 to return server 240 for a definitive return status determination. Standard encryption and security means may be employed.

Return server 240 may be implemented, for example, using a RISC (Reduced Instruction Set Computer) computing machine, such as is manufactured by the International Business Machines Corporations. Such computing machines generally comprise a processor (e.g., Intel Pentium), disk drive storage devices, electronic semiconductor memory storage devices, and input/output devices.

Return server 240 uses a database 250 of rules to make an initial determination of the return policy for each item. For items for which a dynamic policy applies, dynamic policy server 255 is consulted to evaluate all of the variables and conditions that determine the business value of the returned item, including current business conditions and markets, inventory levels, weather conditions, seasonal factors, the age/value curve for the product, etc. For each item that return server 240 authorizes a complete or partial return, accounting server 260 adjusts the accounting records of business establishment 160, and possibly provides a credit for the account of customer 105. For each item for which return server 240 requires the return of the item, an inventory server 270 prepares a receipt and provides for its restoration to inventory. After each item on return list 220 has been considered, return server 240 identifies or presents a return confirmation and policy update 221 to local computing device 210. The confirmation and update 221 is sent via network 150, also using standard encryption and security methods. Once local computing device 210 has received the confirmation and policy update 221, customer 105 can review it, and make plans to return the authorized items within the terms of the relevant return policies.

Figure 3:
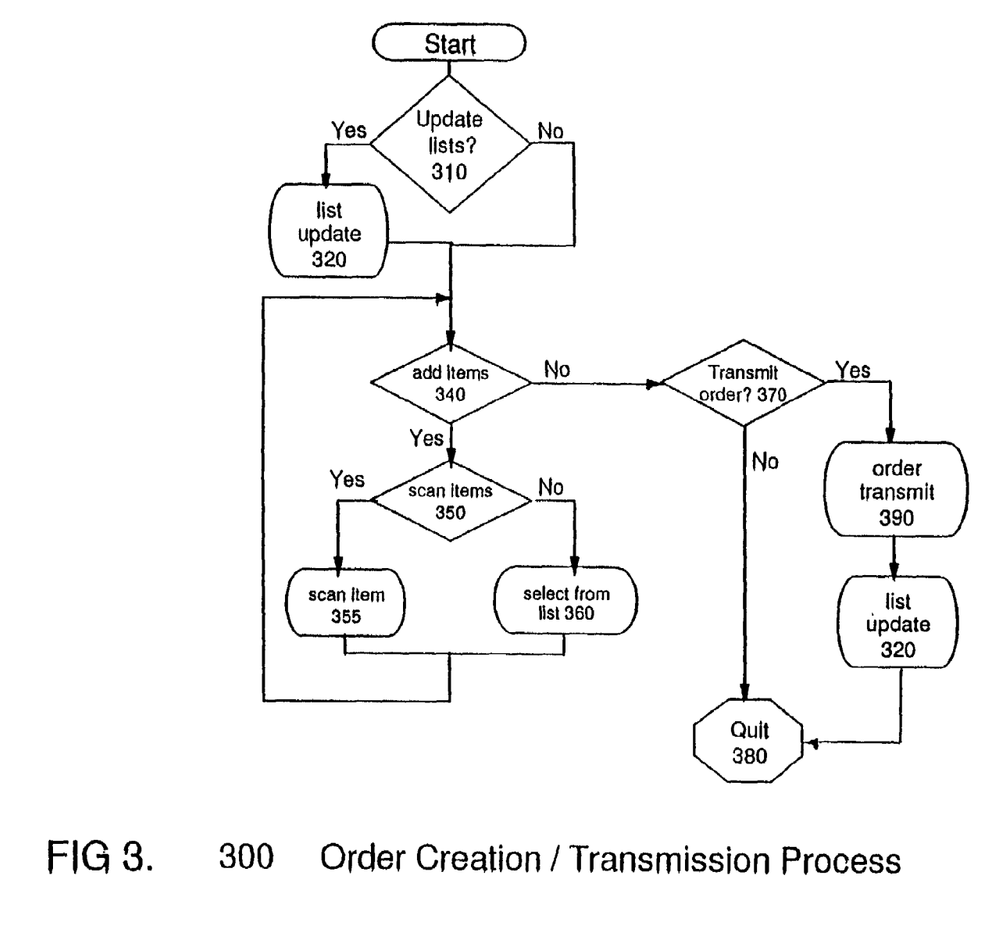
FIG. 3 is a flow diagram illustrating a method for the creation of orders and order lists.

Referring to FIG. 3, an order creation/transmission process 300 depicts the creation of an order on local computing device 210 and the transmission of the order to business establishment 160. Order creation process 300 begins at step 310, which determines if customer 105 has chosen to update the lists of available products or catalog 310, resident in product database 211. Since local computing device 210 may not always be in communication with server 240 to receive product list updates, product database 211 on the local computing device 210 may be out of date. If customer 105 chooses to update the list, local computing device 210 initiates an update list procedure 320 that connects local computing device 210 via network 150 to server 240 or other server containing the master product list so as to refresh product database 211. Product database 211 could merely contain a copy of the entire master product list or a subset thereof personalized for a particular customer 105.

Regardless of whether a choice is made to update the lists, customer 105, at step 340, chooses to either add or not add items to the order. If customer 105 chooses to add items, step 350 determines if the items are being scanned with scanner 108. If so, step 355 processes the scanned items. If not, step 360 processes item selections made by customer 105 from a displayed product list provided by database 211. The customer can iteratively add additional items in this fashion by repeating steps 340, 350 and 355 or 360. When step 340 determines that customer 105 has chosen not to enter any more items, step 370 determines if customer 370 has entered a transmit command. If not, step 380 quits or ends order creation/transmission process 300. If step 370 determines that customer 105 has decided to transmit the order, step 390 establishes a network connection between local computing device 210 and server 240. The order is uploaded to server 240. Thereafter, server 240 downloads any necessary changes to the product list. Step 320 then processes any downloaded changes for updates to the product list database 211.

Figure 4A:
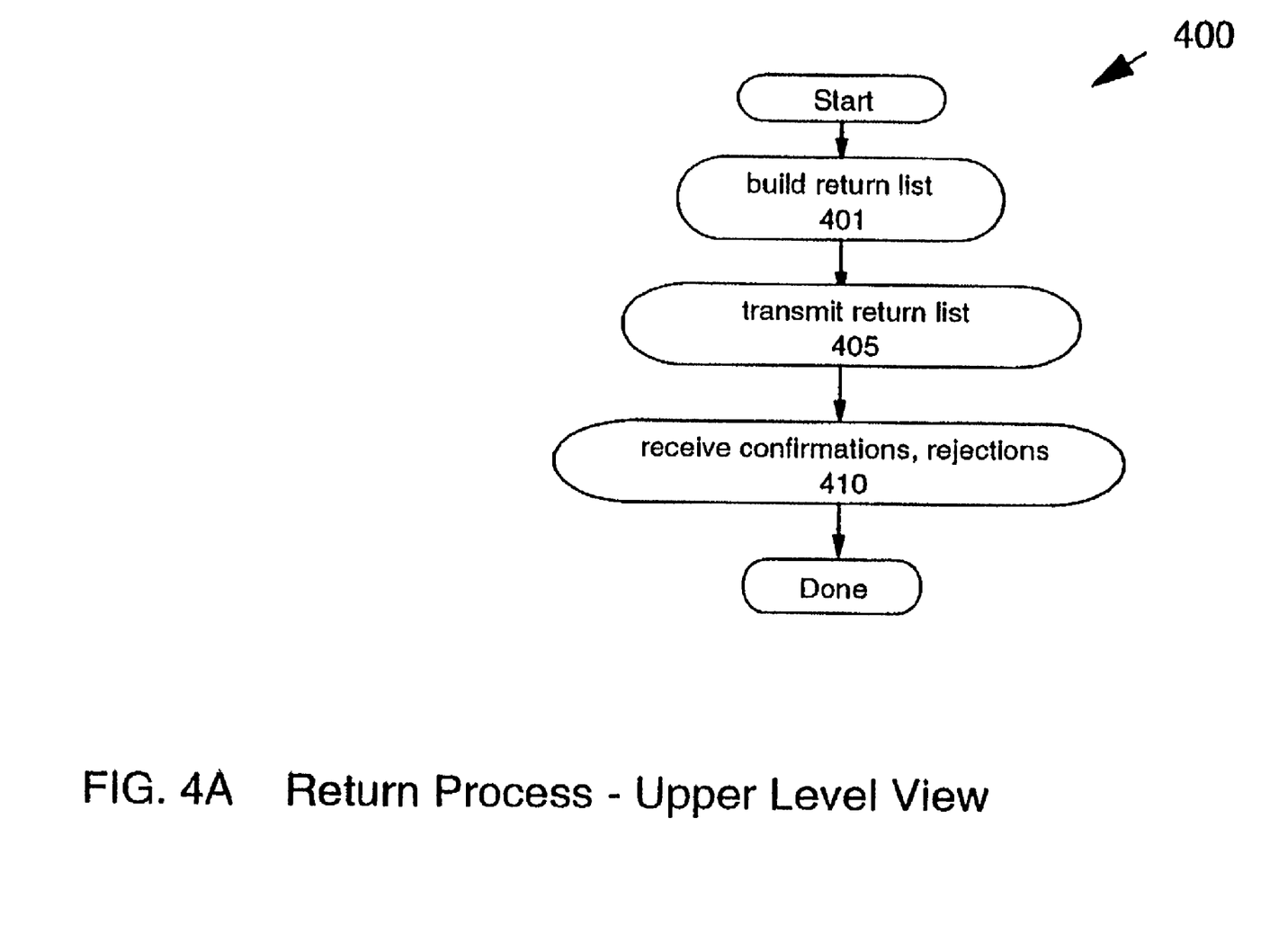
FIG. 4A is an upper level flow diagram illustrating a method for implementing the return process.

Referring to FIG. 4A, a return process of the present invention begins at step 401 with a process of building the return item list 220. When completed, the return list is then transmitted by step 405 to return server 240 of FIG. 2. Return server 240 processes the return item list and sends back a confirmation and policy updates 221. Step 410 receives confirmation and policy update 221 and process 400 then ends.

Associated with each item on the return list is a set of item-related and customer-related identification information or data. This information may be captured and used for data mining. Data mining is a method of collection and storage of data about customers which, through analysis, may be used to make the business process more efficient and to improve relations with customers. The specific type of data captured includes but is not limited to: customer identification (name or number), product identification, store where purchased, date of purchase, date of return, quantity purchased, quantity returned, reason for return, whether or not return was handled as an exception to the returns policy, etc.

One data mining process is the tracking of items not only purchased by the customer but also retained (not returned) by the customer. This would more accurately determine the customer's tastes or preferences than would be possible by examining which items were simply purchased. Another process may gauge the quality, reliability or usability of a product by how often it is returned. A third data mining process has a direct affect on the method of this invention. This process would analyze the customer purchase and return history to determine whether an exception to the return policy should be granted to this particular customer because of the value of their business or the small number of returns they have generated.

Figure 4B:
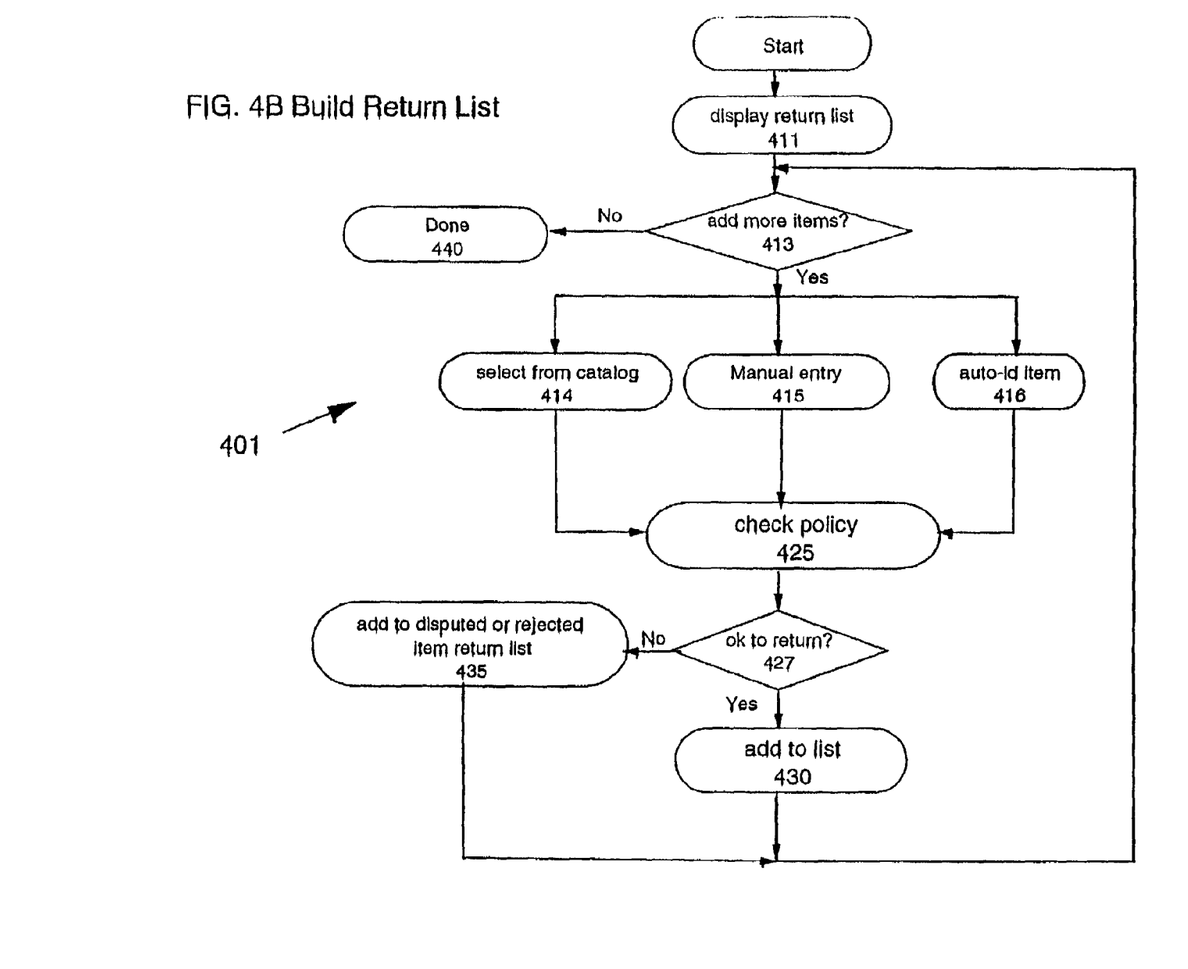
FIG. 4B is a detailed flow diagram illustrating a method for building a return list.

Referring to FIG. 4B, build return list process 401 begins at step 411 in response to a selection thereof by customer 105. For example, customer 105 may be presented with several choices, one of which is to build or develop a list of items to be returned. Step 411 presents a display of an existing, possibly empty, return list that is not yet transmitted or presented to the return server 240. Step 413 determines if customer 105 wants to enter more items. If more items are to be entered, customer 105 has a choice of an entry mode. Thus, if customer 105 chooses to select items from the product master list in product database 211, step 414 presents a display of the product master list and processes an entry. If customer 105 chooses to manually enter the items to be returned, step 415 prompts customer 105 to make an entry and then processes the entry. Manual entry may be by means of keyboard entry or voice recognition. If customer 105 chooses to enter the items by reading a tag on the products, then step 416 prompts customer 105 to read a tag as by bar code scanner 108.

Step 425 examines product return policies of database 213 in respect of the entered item. Step 427 determines if the return policy permits return of the entered item. If yes, step 430 adds the item to the return list and step 413 is repeated. If not, step 435 adds the entered item to a sublist of disputed or rejected items and step 413 is repeated. If step 413 determines that more items are to be added, build return process 401 process continues. If not, build return process 401 process is complete and ends at step 440.

Although, build return list process 401 may be implemented on local computing device 210, it may also be implemented on return server 240 when local computing device 210 is connected to return server 240. The sublist of items that are deemed rejected or disputed may be sent to return server 240 or referred to a person for a second opinion.

Figure 5:
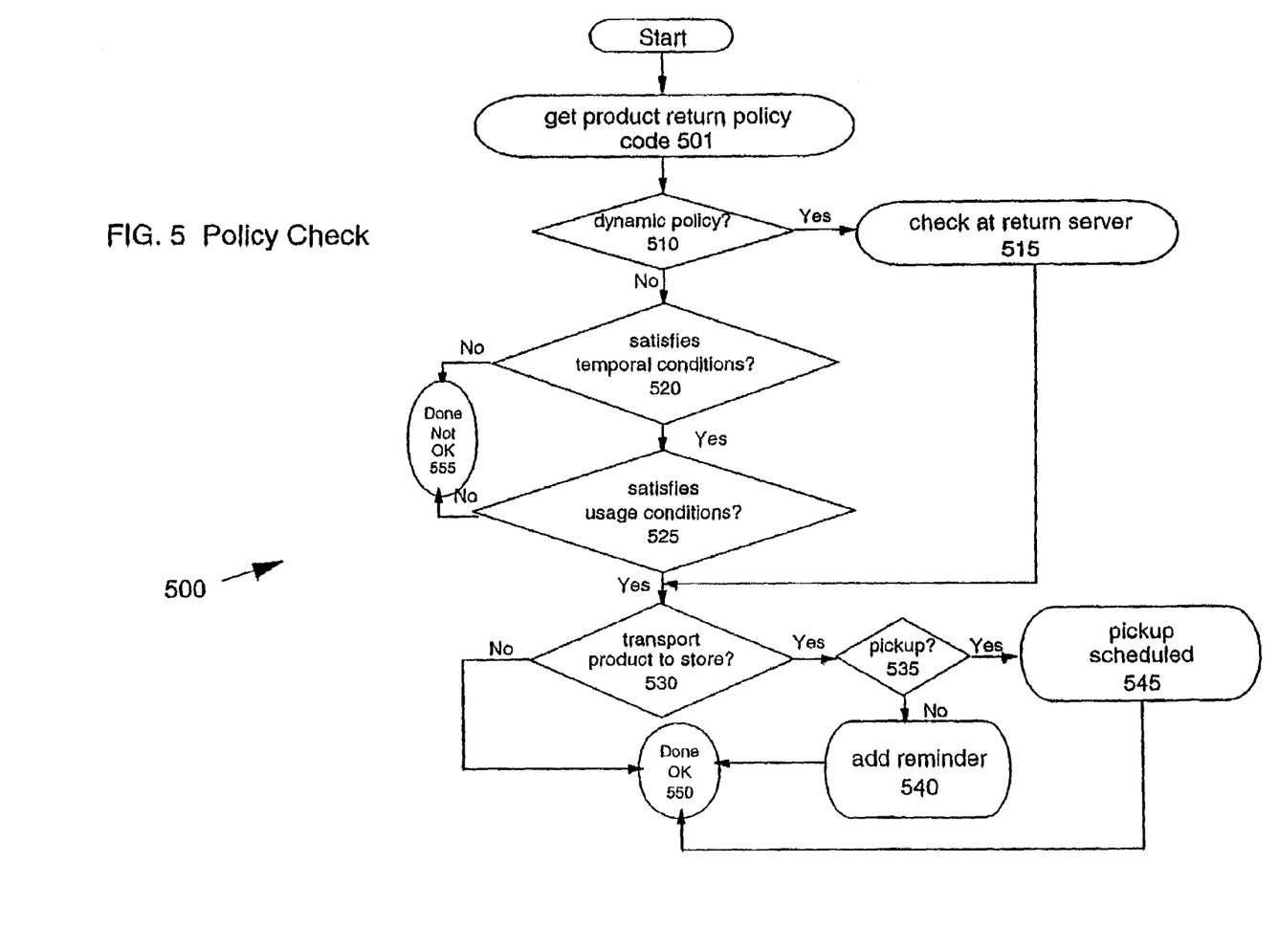
FIG. 5 is a flow diagram illustrating the details of a method for checking the return policy.

Referring to FIG. 5, a policy check process 500 is depicted for checking return policies. Return server 240 may establish a variety of return policies, some of which can be time dependent (temporal), e.g., all products must be returned within a specified time. The time to return may vary for different products. Return policies may vary in time. For example, a credit given to customer 105 may vary based on how long after the purchase the product is returned or whether the product is no longer in demand, e.g., snow shovels, cannot be returned in July. Policies that change as a function of time are dynamic policies. They may take into account business conditions, such as inventory and current demand, among other things to determine the product return policy.

Policy check process 500 begins at step 501 that gets a return policy code associated with the item to be returned. This is done on local computing device 210. Step 510 determines if the item is associated with a dynamic return policy. If so, step 515 checks with return server 240 and processes any response received from return server 240. If step 510 determines that the item does not have an associated dynamic policy, step 520 determines if the item satisfies temporal conditions. If the item satisfies all the temporal conditions, step 525 determines if the item satisfies usage conditions. For example, has the product been opened, or has it gone sour. If the item fails to meet temporal conditions or usage conditions, step 555 indicates a failure. That is, the return policy of business establishment 160 will not honor a return of the item.

If the item to be returned meets temporal conditions and usage conditions, step 530 determines from return policy database 213 if the item has to be returned to business establishment 160. If the item needs to be taken back to business establishment 160, step 535 is performed. If the item can simply be discarded, then step 550 indicates success. Step 535 checks whether pickup can be arranged. If so, step 545 schedules the pickup. If pickup is not available for this item, then step 540 sends a reminder to remind customer 105 to take the item to business establishment 160. If the item is not recognized in any of the steps of build return list process 401 or of policy check process 500, then business establishment 160 may arrange for a pickup/drop-off, and may credit the account of customer 105 after appraisal of the item. Customer 105 is notified of the results of transport product step 530 and pick up step 535 by, for example, presenting a notice to local computing device 210. This could be done, for example, by email or posting to a web site or page If desired, the return lists of customer 105 can be retained by return server 240 for analysis of the return patterns of customer 105.

In the embodiment of the system and method described above, the computing functions have been distributed as shown in FIG. 2 between devices 205 including local computing device 210 at the location of the customer 101 and devices 245 including return (remote) server 240 at the location of the business establishment 160. However, this particular partition of computing devices and function is not absolutely essential to invention. The power of computing systems is continuing to increase according to the well-known Moore's law, doubling about every eighteen months. Storage capability is increasing at an equal or greater rate. The personal computers of today possess the capabilities of the main frames of just a few years ago. Thus, the invention may be implemented by transferring all or most of the functions of the system and method described as performed on the server to the local computing device 210.

Thus, in an alternative embodiment, the information shown contained in the databases 250, 260, and 270 at business establishment 160 can be contained in databases at customer location 101 and the computing functions of servers 240 and 255 at the location 160 can be included in those of local computing device 210 at customer location 101. Periodic updates of the databases at the customer location for rules, return policies, and inventory can be accomplished over network connections. The results of the return process can be sent later to business establishment 160 similarly by means of a network connection.

Additionally, in another alternative embodiment, the computing functions and storage databases of the devices 205 located at the customer location 101 may all be included in the servers and databases 245 at the location of the business establishment 160. For instance, the steps described above in the detailed description of the figures may all be accomplished by a customer using a kiosk containing the appropriate devices at the location of the business establishment. The word remote indicates that the server is located at the business establishment.

It is then possible to partition the functions of the invention in such a way that all or part may be performed using devices either at the customer location or at the business establishment location. The various computing functions may be performed partly on computing devices that include both local and remote computing devices (e.g., first, second and third computing devices).

The present invention having been thus described with particular reference to the preferred forms thereof, it will be obvious that various changes and modifications may be made therein without departing from the spirit and scope of the present invention as defined in the appended claims.

What is claimed is:

1. A computer-implemented method for a customer to return one or more items previously supplied by a business establishment to said customer, comprising:
   developing a list of items to be returned by
      adding one or more items presented by said customer to said list of items to be returned,
      checking each of said items to be returned with a return policy of said business establishment, said checking being performed upon each item's addition to said list by computing devices associated with a customer location that locally store said return policy, and
      advising said customer of the likely return status of said listed items;
   presenting said list of items for processing by said business establishment;
   identifying a definitive confirmation of said items on said list that are authorized to be returnable and/or any of the items that are not authorized to be returnable,
   wherein said authorization is performed by computing devices associated with said business establishment that store said return policy and wherein said return policy includes a dynamic rule that a business value condition must be satisfied; and
   presenting said definitive confirmation to said computing devices associated with the customer location.

2. The method of claim 1, wherein said confirmation further comprises presenting notification to said computing devices associated with a customer location of any updates to said return policy, and wherein said computing devices then update said locally stored return policy.

3. The method of claim 1, wherein said rules comprise at least one rule that a condition must be satisfied, and wherein said condition is either temporal or usage.

4. The method of claim 1, wherein said business condition is at least one condition selected from the group consisting of: a current market condition, an inventory level, a current demand, a weather condition, a seasonal factor, and any combination thereof.

5. The method of claim 1, wherein said developing step further comprises determining if said return policy requires that one of said items needs to be physically returned to said business establishment, and if not, presenting notice that said one item can be discarded.

6. The method of claim 1, wherein said developing step further comprises determining if said business establishment will have one of said items picked up, and if so, scheduling a pick up of that item and if not, presenting a notice that said item must be transported to the business establishment.

7. The method of claim 1, further comprising a step of collecting data associated with said items, said data comprising at least one member selected from the group consisting of: customer identification, product identification, store where purchased, date of purchase, date of return, quantity purchased, quantity returned, reason for return, and whether or not to return was handled as an exception to the returns policy.

8. The method of claim 7, further comprising a step of mining said data.

9. The method of claim 7, further comprising making said data available for mining.

10. A computing system for processing the return of one or more items by a customer previously supplied by a business establishment, the system comprising one or more networked computing devices each device having a memory with program code stored therein for:
  developing a list of items to be returned
    by checking each of said items to be returned with a return policy of said business establishment, said checking being performed upon each item's addition to said list by computing devices associated with a customer location that locally store said return policy, and
    adding to said list only those items that are returnable according to said return policy;
  presenting said list of items for processing by said business establishment; and
  identifying a definitive confirmation of said items on said list that are returnable and/or any of the items that are not returnable,
  wherein said identifying is performed by computing devices associated with said business establishment that store said return policy and wherein said return policy includes a dynamic rule that one or more conditions selected from the group consisting of a current market condition, an inventory level, a current demand, a weather condition, a seasonal factor must be satisfied.

11. The computing system of claim 10, wherein said computing devices further develop a notice to return an item that is determined not returnable according to said policy, and present said notice to said business establishment.

12. The computing system of claim 10, wherein said return policy includes a rule that a condition must be satisfied, and wherein said condition is either temporal or usage.

13. The computing system of claim 10, further comprising an input device, wherein each of said items to be returned is entered by said input device, and wherein said input device is selected from the group consisting of: keyboard, mouse, touch screen, stylus pad, radio frequency tag reader, bar code reader, microphone and any combination thereof.

14. The computing system of claim 10, wherein said computing devices further determine if said return policy requires that one of said items needs to be physically returned to said business establishment, and if not, further notify a user that said one item can be discarded.

15. The computing system of claim 10, wherein said computing devices further determine if said business establishment will have one of said items picked up, and if so, further schedule a pick up of that item and if not, further present notice to a user that said item must be transported to the business establishment.

16. The computing system of claim 10, wherein said computing devices further collect data associated with said items, wherein said data comprises at least one member selected from the group consisting of: customer identification, product identification, store where purchased, date of purchase, date of return, quantity purchased, quantity returned, reason for return, and whether or not to return was handled as an exception to the returns policy.

17. The computing system of claim 10, further comprising an input device, wherein each of said items to be returned is entered by said input device, and wherein said input device is a radio frequency tag reader.

18. A memory media for the control of a computer system that processes the return of one or more items by a customer previously supplied by a business establishment comprising, the memory media comprising instructions encoded thereon for:
  developing a list of items to be returned by
    checking each of said items to be returned with a return policy of said business establishment, said checking being performed upon each item's addition to said list by computing devices associated with a customer location that locally store said return policy, and
    adding to said list only those items that are returnable according to said return policy;
  presenting said list of items for processing by said business establishment; and
  identifying a definitive confirmation of said items on said list that are returnable and/or any of the items that are not returnable,
  wherein said identifying is performed by computing devices associated with said business establishment that store said return policy and wherein said return policy includes a dynamic rule that one or more conditions selected from the group consisting of a current market condition, an inventory level, a current demand, a weather condition, a seasonal factor must be satisfied.

19. The memory media of claim 18 further comprising instructions for developing a notice to return an item that is determined not returnable according to said policy, and for presenting presents said notice to said business establishment.

20. The memory media of claim 18, wherein said return policy includes a rule that a condition must be satisfied, and wherein said condition is either temporal or usage.

21. The memory media of claim 18 further comprising instructions for determining if said return policy requires that one of said items needs to be physically returned to said business establishment, and if not, for notifying a user that said one item can be discarded.

22. The memory media of claim 18 further comprising instructions for determining if said business establishment will have one of said items picked up, and if so, for scheduling a pick up of that item and if not, for presenting notice to a user that that item must be transported to the business establishment.

23. The memory media of claim 18, further comprising instructions for collecting data associated with said items, wherein said data comprises at least one member selected from the group consisting of: customer identification, product identification, store where purchased, date of purchase, date of return, quantity purchased, quantity returned, reason for return, and whether or not to return was handled as an exception to the returns policy.

24. A computer-implemented method for a customer to one or more return of items previously supplied by a business establishment, comprising:
  developing a list of items to be returned by
    checking each of said items to be returned with a return policy of said business establishment, said checking being performed upon each item's addition to said list by computing devices associated with a customer location that locally store said return policy, and adding to said list only those items that are returnable according to said return policy;

presenting said list of items for processing by said business establishment; and identifying a definitive confirmation of said items on said list that are returnable and/or any of the items that are not returnable, wherein said identifying is performed by computing devices associated with said business establishment that store said return policy and wherein said return policy includes a dynamic rule that one or more conditions selected from the group consisting of a current market condition, an inventory level, a current demand, a weather condition, a seasonal factor must be satisfied.

25. The method of claim 24 wherein said confirmation includes notification of any updates to said return policy.

26. The method of claim 24 wherein said developing step further comprises developing a notice to return an item that is determined not returnable according to said policy, and presenting said notice to said business establishment.

27. The method of claim 24 wherein said developing step further comprises determining if said return policy requires that one of said items needs to be physically returned to said business establishment, and if not, presenting notice that said one item can be discarded.

28. The method of claim 24 wherein said developing step further comprises determining if said business establishment will have one of said items picked up, and if so, scheduling a pick up of that item and if not, presenting a notice that said item must be transported to the business establishment.

29. The method of claim 24 wherein said developing step employs an input device and said presenting and identifying steps employ one or more computing devices.

30. The method of claim 29 wherein at least one of said computing devices is located remotely from said input device.

31. The method of claim 29 wherein at least one of said computing devices is located locally to said input device.

32. A computing system for processing the return of one or more items by a customer previously supplied by a business establishment to said customer, the system comprising one or more networked computing devices, each device having a memory with program code stored therein for:

developing a list of items to be returned by adding one or more items presented by said customer to said list of items to be returned, checking each of said items to be returned with a return policy of said business establishment, said checking being performed upon each item's addition to said list by computing devices associated with a customer location that locally store said return policy, and advising said customer of the likely return status of said listed items;

presenting said list of items for processing by said business establishment; and identifying a definitive confirmation of said items on said list that are authorized to be returnable and/or any of the items that are not authorized to be returnable, wherein said authorization is performed by computing devices associated with said business establishment that store said return policy and wherein said return policy includes a dynamic rule that a business value condition must be satisfied.

33. The computing system of claim 32 wherein said computing devices further develop a notice to return an item that is determined not returnable according to said policy, and present said notice to said business establishment.

34. The computing system of claim 32 wherein said return policy includes a rule that a condition must be satisfied, and wherein said condition is either temporal or usage.

35. The method of claim 32 wherein said business condition is at least one condition selected from the group consisting of: a current market condition, an inventory level, a current demand, a weather condition, a seasonal factor, and any combination thereof.

36. The computing system of claim 32 wherein said computing devices further determine if said return policy requires that one of said items needs to be physically returned to said business establishment, and if not, notify a user that said one item can be discarded.

37. The computing system of claim 32 wherein said computing devices further determine if said business establishment will have one of said items picked up, and if so, schedule a pick up of that item and if not, present notice to a user that said item must be transported to the business establishment.

38. The computing system of claim 32 further comprising an input device, wherein each of said items to be returned is entered by said input device, and wherein said input device is a radio frequency tag reader.

39. A memory media for the control of a computer system that processes the return of items by a customer previously supplied by a business establishment comprising, the memory media comprising instructions encoded thereon for:

developing a list of items to be returned by adding one or more items presented by said customer to said list of items to be returned, checking each of said items to be returned with a return policy of said business establishment, said checking being performed upon each item's addition to said list by computing devices associated with a customer location that locally store said return policy, and advising said customer of the likely return status of said listed items;

presenting said list of items for processing by said business establishment; and identifying a definitive confirmation of said items on said list that are authorized to be returnable and/or any of the items that are not authorized to be returnable, wherein said authorization is performed by computing devices associated with said business establishment that store said return policy and wherein said return policy includes a dynamic rule that a business value condition must be satisfied.

40. The method of claim 1 wherein said locally-stored return policy for an item comprises a dynamic rule, and wherein said developing and checking further comprises said customer-associated computer devices requesting that said business-establishment-associated computing devices check said item with said dynamic rule.

41. The method of claim 1 wherein said business value condition comprises thresholds for amount of business and the number of returns generated by a customer, and further comprising a step of granting a particular customer an exception to at least one return policy if said thresholds are satisfied.

42. The method of claim 10 wherein said developing and checking further comprises said customer-associated computer devices requesting that said business-establishment-associated computing devices check said item with said dynamic rule.

43. The method of claim 10 wherein said dynamic rule further includes a business value condition comprises thresholds for amount of business and the number of returns generated by a customer, and further comprising a step of granting a particular customer an exception to at least one return policy if said thresholds are satisfied.

* * * * *